Aug. 5, 1947.　　　M. SCHLESINGER　　　2,425,048
ADJUSTABLE FORM FOR MAKING DENTAL MODELS
Filed June 22, 1945
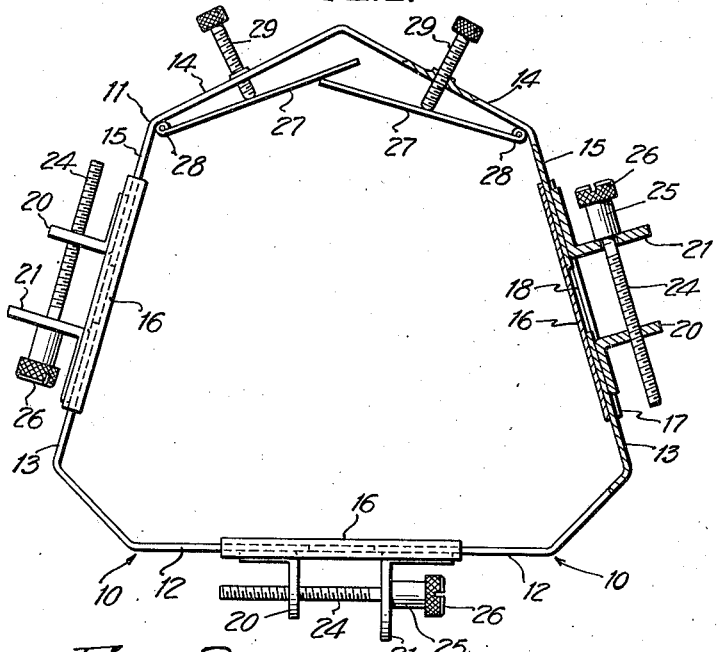
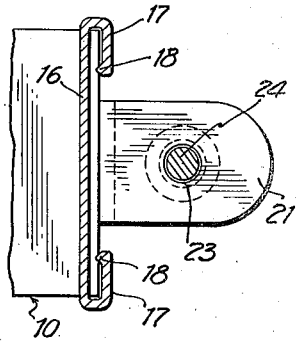
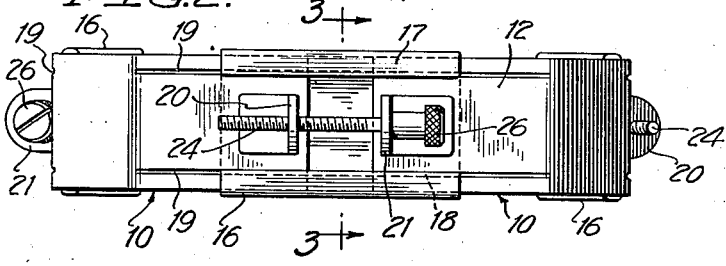
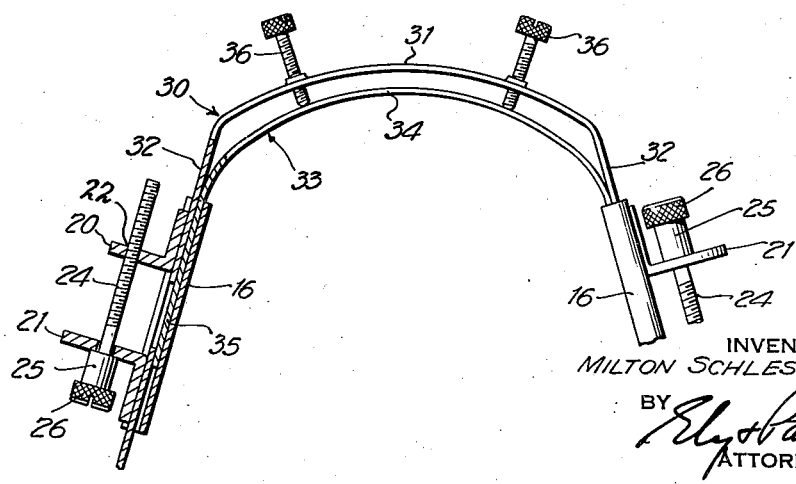
INVENTOR
MILTON SCHLESINGER Patented Aug. 5, 1947

2,425,048

UNITED STATES PATENT OFFICE 2,425,048

ADJUSTABLE FORM FOR MAKING DENTAL MODELS

Milton Schlesinger, Jamaica, N. Y.

Application June 22, 1945, Serial No. 600,989

6 Claims. (Cl. 18—34.1)

This invention relates to a device or former for making dental models, and is a continuation in part of my copending application, Serial No. 433,520, filed March 5, 1942.

An object of the present invention is the provision of a device of the indicated character embodying improvements whereby the device is adjustable so as to accommodate different size dental trays containing a dental impression.

A further object of the invention is the provision of a form of the indicated character embodying improvements whereby to enable the making of finished dental models with their bases, either prosthodontic, orthodontic, or those for study, directly from a dental impression of the partial or full mouth, dentulous or edentulous.

Other objects, advantages and benefits of the invention will appear when the following specification is read in connection with the accompanying drawing, in which, Figure 1 is a plan view of a device embodying the features of the present invention, portions of the device being shown in section.

Figure 2 is an end elevation looking toward the posterior sections of the device.

Figure 3 is an enlarged detail sectional view taken on the line 3—3 of Figure 1.

Figure 4 is a fragmentary plan view showing certain modifications of the device, portions being shown in section.

Referring now more particularly to Figures 1, 2 and 3, it will be apparent from the embodiment of the invention shown, that a device comprises an assemblage of main sections constituting a frame-like structure or enclosed figure of septagonal formation. The device is adapted to be placed upon a suitable flat surface to receive therein a dental tray containing a dental impression, so that suitable plastic material may be placed about and in contact with the various surfaces to conform thereto and thus form a dental model of the desired size and having the desired characteristics.

As shown, the aforesaid main sections of the device consist of similar posterior sections 10, and an anterior section 11. Each of the sections 10 and 11 is made of a piece of strip metal of the desired width and length. Each of the sections 10 consists of portions 12 and 13 respectively. The portions 12 are of angular formation and constitute the posterior portions, whereas the portions 13 are the side portions of the sections 10. Each of the sections 11 consists of portions 14 and 15 respectively. The portions 14 diverge with respect to each other and constitute anterior portions, whereas the portions 15 are the side portions of the section 11. The side portions 13 of the sections 10 match the side portions 15 of the section 11. In other words, the side portions 13 and 15 at each side of the device are disposed end to end in parallelism. Likewise the posterior portions 12 may be disposed end to end. Thus provision is made for adjusting the sections 10 laterally and for adjusting the section 11 longitudinally with respect to the sections 10 in order to obtain a suitable increase or decrease in the size of the device to accommodate different size dental trays containing the dental impression to be modeled.

In order to maintain the sections 10 and 11 in the desired adjusted model-forming relation there are provided means as follows. The portions 12 of the sections 10 and the portions 13 and 15 of the sections 10 and 11 are slidably engaged with channel shaped splices 16. Each splice member has inturned longitudinal edge portions 17 having tongues or projections 18 receivable in grooves 19 respectively in the related portions 12, 13 and 15, as the case may be. Lugs 20 and 21 are secured to the portions 12, 13 and 15, respectively. The lug 20 has a tapped hole 22 therein, whereas the lug 21 has an untapped hole 23 therein larger than the hole 22. A screw 24 is received in the holes 22 and 23 of each pair of lugs 20 and 21. The screw 24 has an enlarged portion 25 which bears on the related lug 21 while the threaded portion is in threaded engagement with the lug 20. A knurled head 26 on the screw serves for turning it to make the desired adjustments as will be obvious.

The portions 14 of the section 11 may themselves serve as anterior form members, or use may be made of individually adjustable form members or strips 27 as shown in Figure 1. Each of the members 27 has one end hingedly or pivotally connected with the section 11 at the inside, as at 28. These pivotal connections 28 are at the junctures respectively of the portions 14 and 15. Set screws or adjusting element 29 carried by the portions 14 abut the form members 27, respectively, to limit the outward movement to the desired position of adjustment.

From the foregoing it will be understood the sections 10 may be adjusted laterally or transversely toward and away from each other by manipulating the screw at the posterior end of the device, and the section 11 may be given a corresponding longitudinal adjustment with respect to the sections 10 by manipulating the screws at the opposite sides of the device. Thus the size of the device may be changed by adjusting the sections 10 and 11, and these sections may be effectually maintained assembled in the adjusted model-forming relation in use.

The form members 27 may be adjusted to cooperate with the spliced portions 12, 13 and 15 also serving as form members, to shape a dental model to the desired conformation.

As shown in Figure 4 an anterior section 30 having an arcuate portion 31 and straight side portions 32 may be used in lieu of the anterior section 11. Also an anterior form member 33 having an arcuate portion 34 and straight side portions 35 may be used in lieu of the form members 27. Set screws or adjusting element 36 carried by the portion 31 abut the portion 31 to limit its outward movement to the desired adjusted position. The side portions 35 are received in the side splices which are constructed to receive them, as well as the side portions of the posterior and anterior sections of the device, which, in other respects is similar to that shown in Figures 1, 2 and 3, and therefore similar reference numerals are applied to corresponding parts.

There is shown and described devices according to the present invention differing somewhat in outline yet each is adapted to the production of finished dental models in the shapes desired according to good dental technique. It is to be understood however that minor changes as to the shape of the outline may be resorted to if desired.

Having thus described my invention, what I claim as new and desire to secure by Letters Patent is:

1. A device for forming dental models comprising sections arranged end to end to form a closed figure, members for connecting said ends, each of said members having its opposite edges overturned to form channels receiving the ends of said sections, said edges having tongues on their inner faces and said sections having grooves receiving said tongues and means for engaging each of said sections adjacent said members to adjust the ends thereof towards and from each other and vary the size of said device.

2. A device for forming dental models comprising sections arranged end to end to form a closed figure, members connecting said sections, the latter having channels to receive the ends of said sections, means carried by said sections adjacent said members for adjusting the latter, an arch-shaped member within said device having its ends received within the channels of some of said connecting members, and adjusting elements carried by part of said device to engage said member.

3. A device for forming dental models comprising sections arranged end to end to form a closed figure, means for connecting said sections at said ends, one or more members pivotally connected to part of said device on the inner side thereof, and a separate element for each of said pivoted members to adjust same.

4. A device for forming dental models comprising sections arranged end to end, connecting members having telescopic engagement with said ends, means associated with said ends for adjusting said sections, pivoted members secured to the inside of part of said device, and screws carried by said part to adjust said pivoted members.

5. A device for forming dental models comprising sections arranged end to end, connecting members having channels along their opposite edges for receiving said ends, an additional member on the inner side of part of said device, said connecting members receiving the ends of said additional member in telescopic engagement, and elements carried by said part to engage said additional member to adjust same.

6. A device for forming dental models comprising sections arranged end to end, connecting members having their opposite edges bent to form channels, said edges having tongues on the inner faces thereof, and said sections having grooves in said ends to receive the tongues, lugs attached to each of the adjacent ends of said sections at said connecting members, screws to engage said lugs to determine the position of said sections, an adjusting member within part of said device and secured thereto, and means for adjusting the last named member.

MILTON SCHLESINGER.

REFERENCES CITED

The following references are of record in the file of this patent:

UNITED STATES PATENTS

| Number | Name | Date |
|---|---|---|
| 1,479,946 | Warren | Jan. 8, 1924 |
| 455,293 | Richardson | June 30, 1891 |
| 1,972,238 | Reiffel | Sept. 4, 1934 |
| 1,477,091 | VonDerHeydt | Dec. 11, 1923 |
| 2,083,563 | Hill et al. | June 15, 1937 |
| 1,610,974 | Sarna | Dec. 14, 1926 |

FOREIGN PATENTS

| Number | Country | Date |
|---|---|---|
| 14,806 | Great Britain | May 11, 1911 |
| 600,592 | Germany | Mar. 2, 1933 |